Aug. 14, 1956  A. F. HICKMAN  2,758,832
SPRING SUSPENSION FOR VEHICLES
Filed Feb. 28, 1951  6 Sheets-Sheet 2
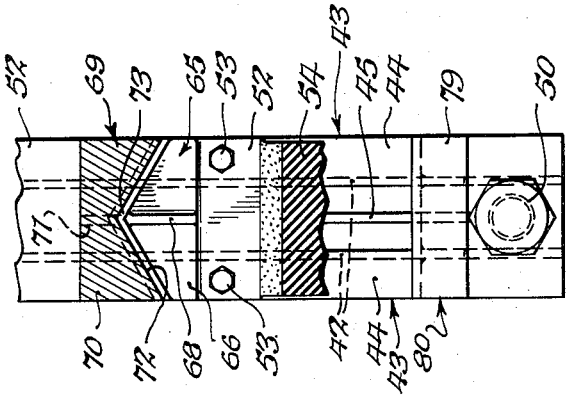
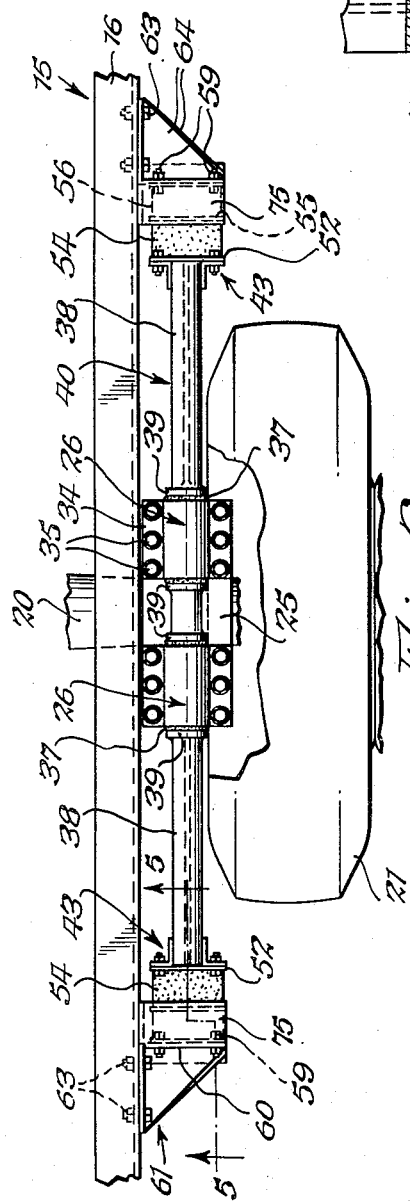
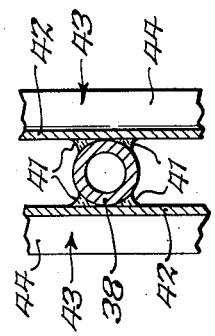
INVENTOR.
Albert F. Hickman
BY
Popps and Sommer
Attorneys.

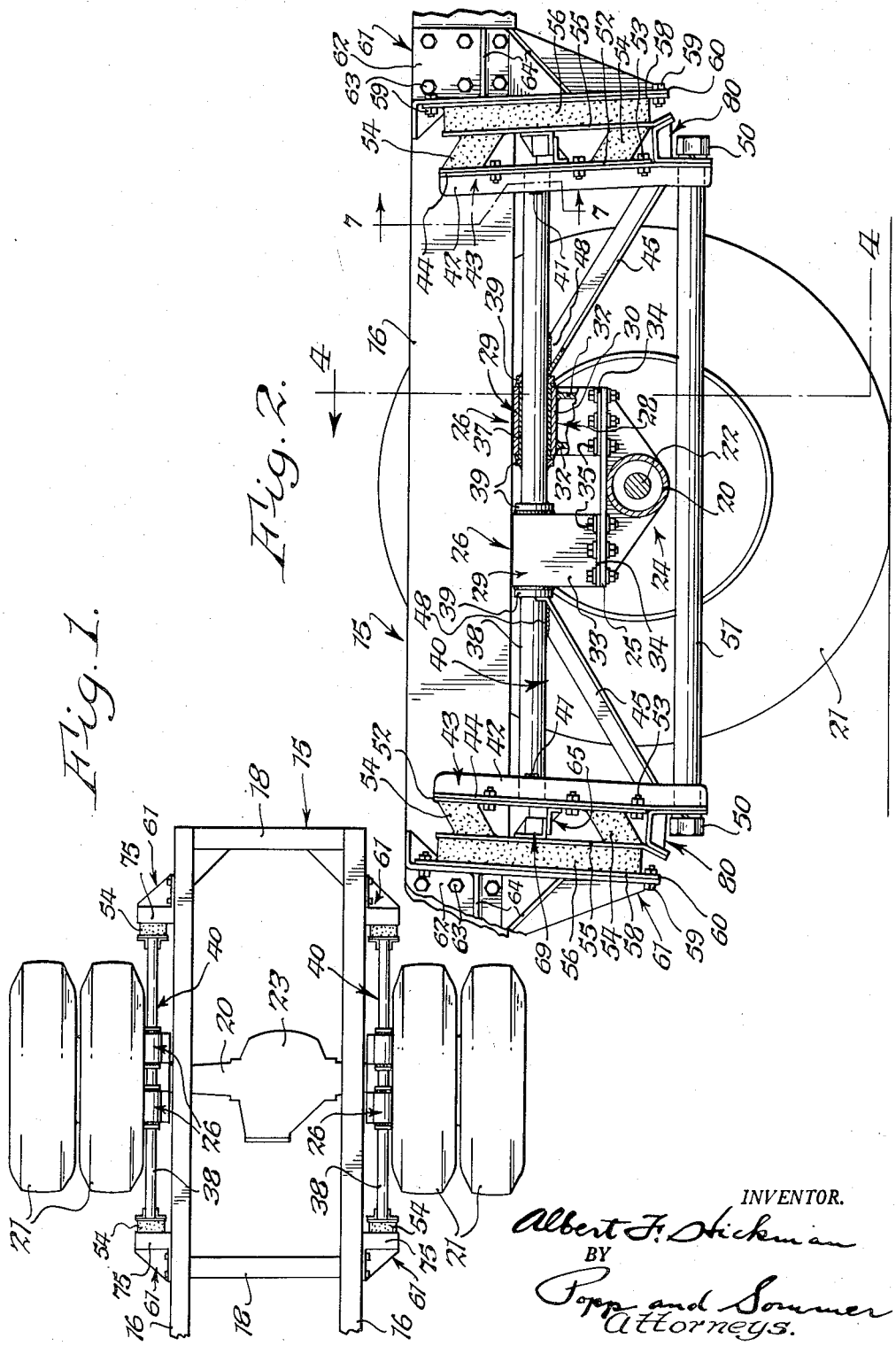

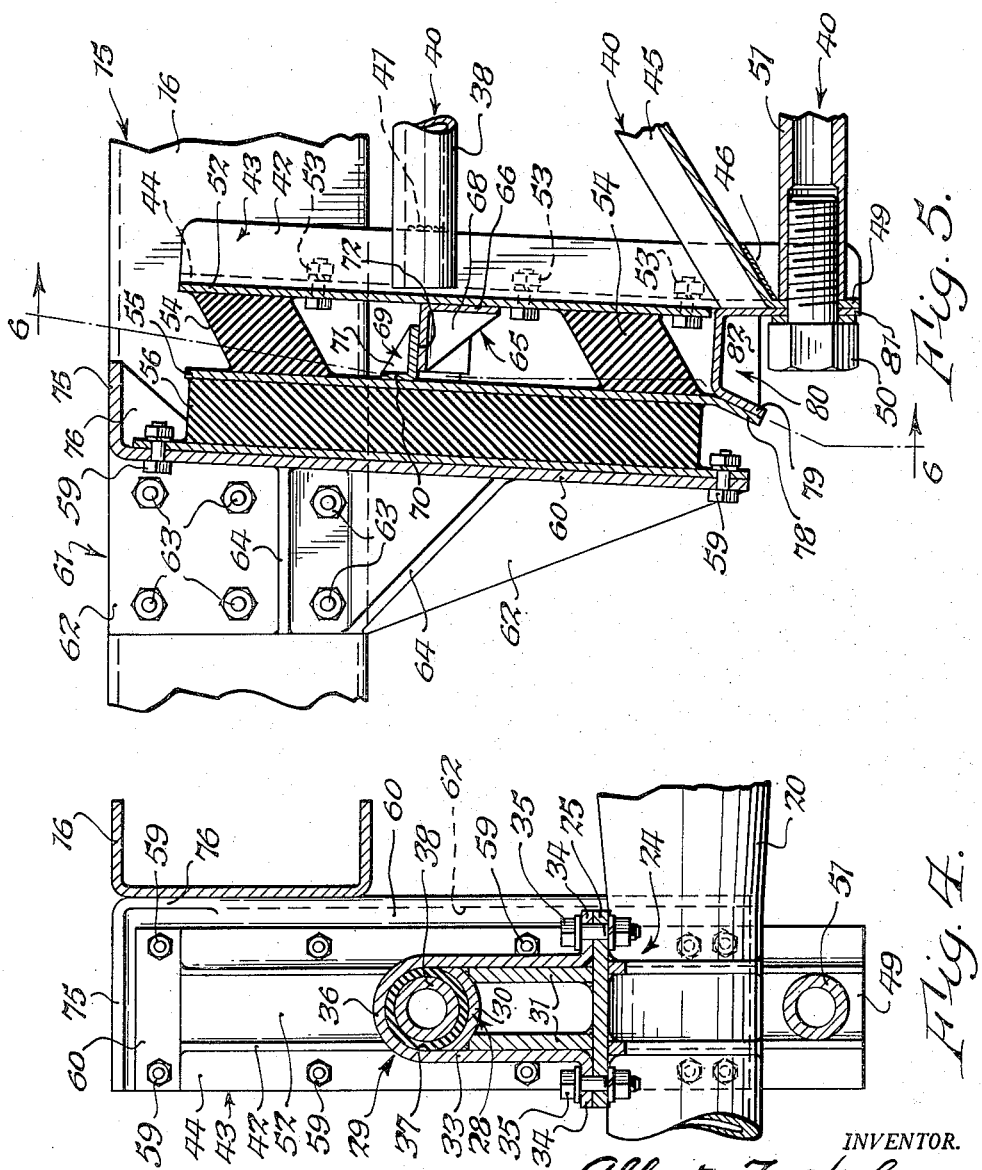

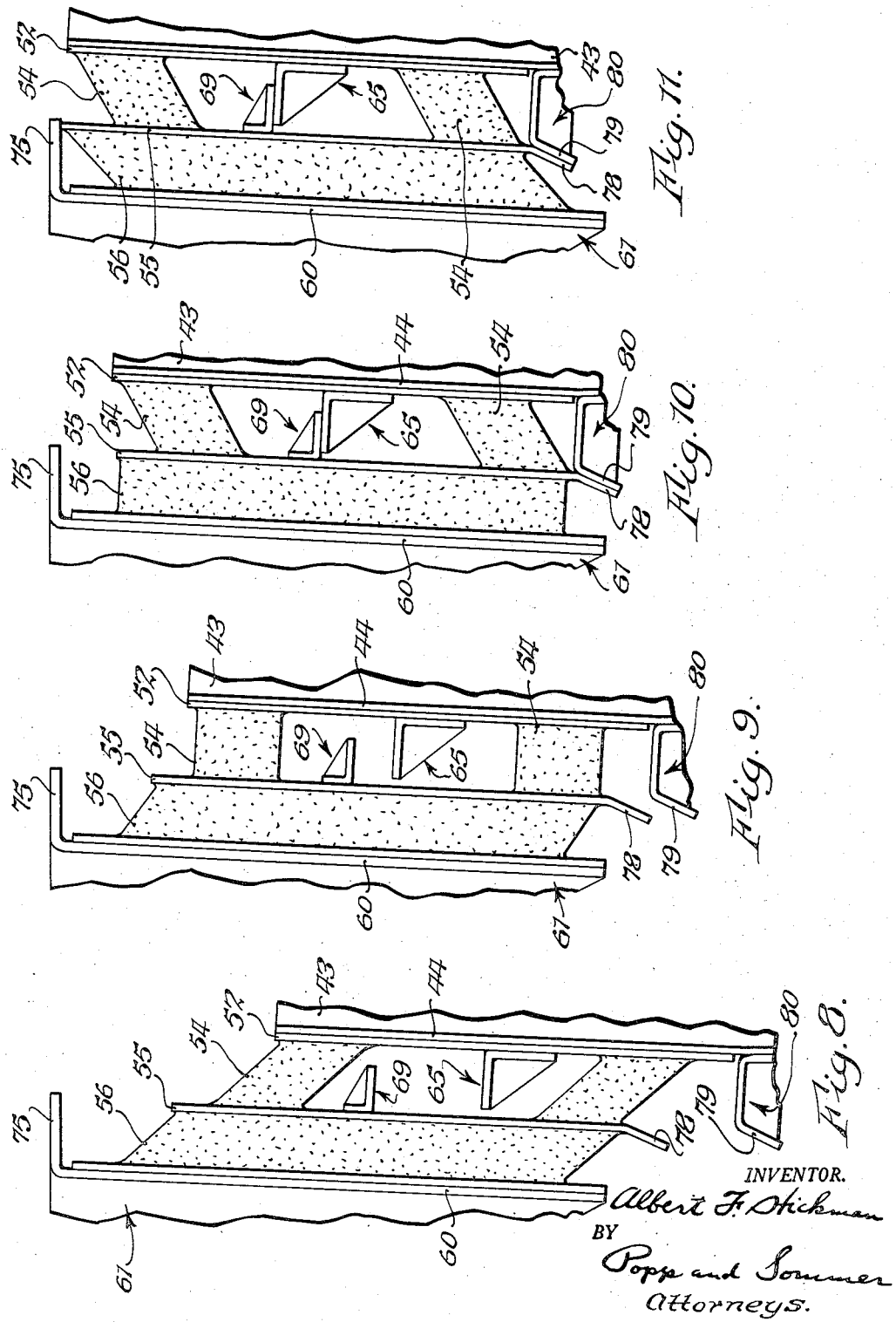

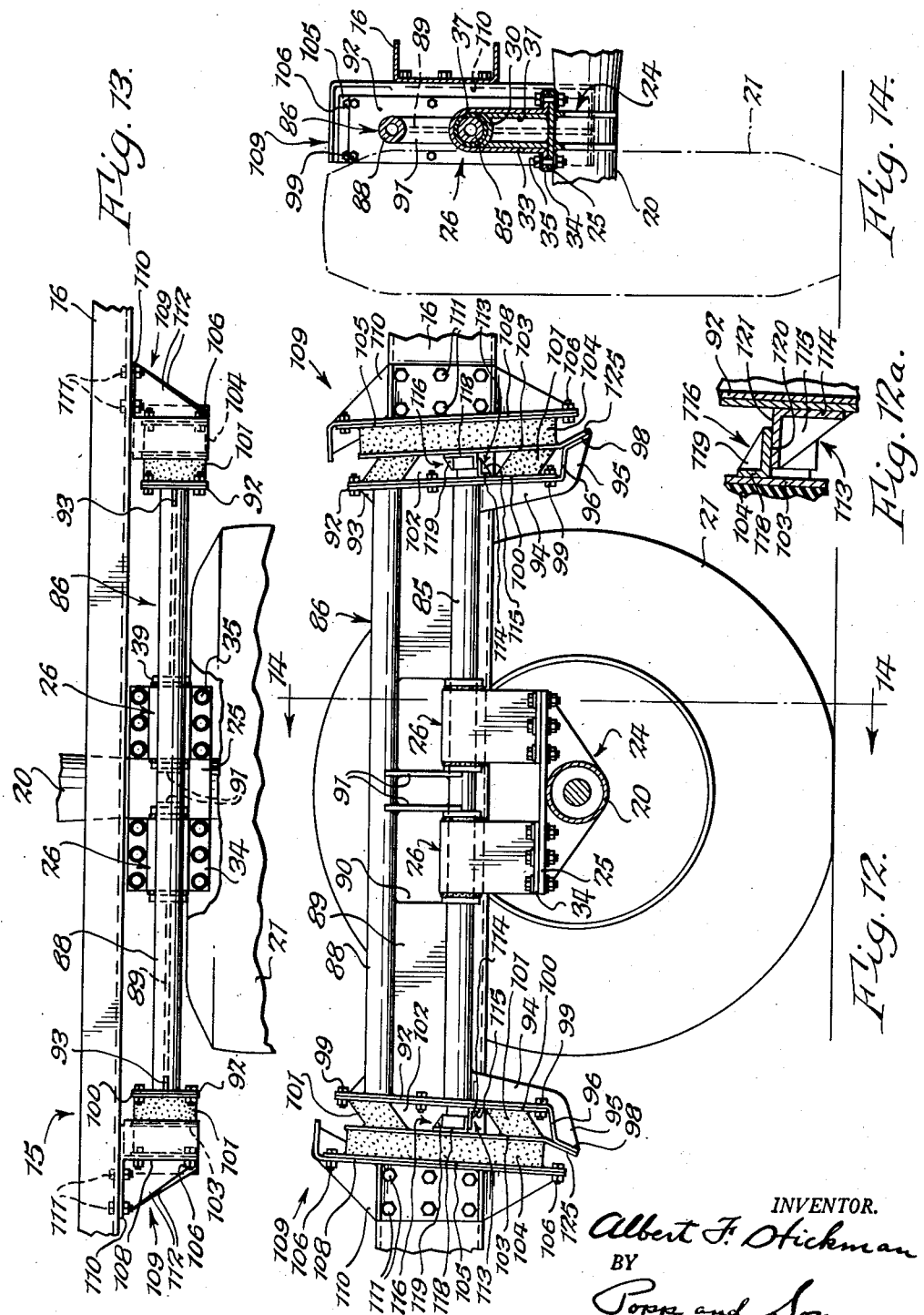

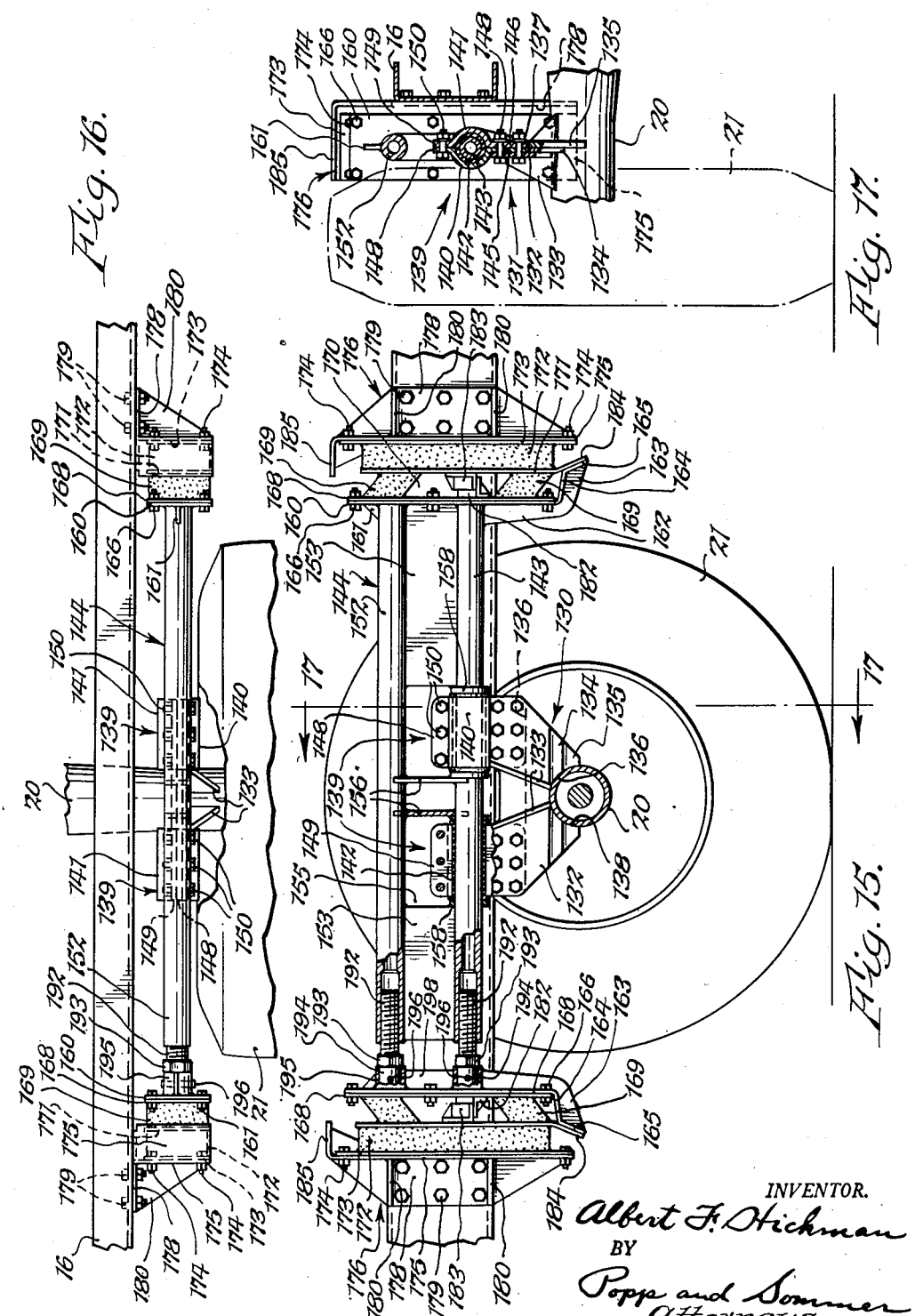

United States Patent Office 2,758,832
Patented Aug. 14, 1956

---

2,758,832

SPRING SUSPENSION FOR VEHICLES

Albert F. Hickman, Eden, N. Y., assignor to Hickman Developments, Inc., Eden, N. Y., a corporation of New York Application February 28, 1951, Serial No. 213,194

30 Claims. (Cl. 267—63)

This invention relates to a spring suspension for vehicles of the shear rubber, rectilinear movement type and is more particularly shown as embodied in a suspension between a highway vehicle frame and the rear driving axle thereof although features of the invention can also be used in suspensions between a vehicle frame and tandem axles as illustrated in my companion application for Tandem Axle Vehicle Spring Suspension, Serial No. 260,463, filed December 7, 1951, now Pat. 2,704,664, issued March 22, 1955. This application is also a companion to a parent application for Vehicle Spring Suspension, Serial No. 207,999, filed January 26, 1951, now Pat. 2,706,113, issued April 12, 1955.

One of the important objects of the present invention is to provide a shear rubber, rectilinear movement type of spring suspension which will permit the large amount of vertical axle movement necessary with highway vehicles to provide a vertical ride as soft as load heights will allow and at a low frequency, in the order of 105 to 110 cycles per minute, at the rear end of conventional trucks when empty, and at a frequency close to 100 cycles per minute under full loads.

Another important object of the invention is to provide such a suspension which is free from friction but is automatically controlled by an increasing resistance to motion in proportion to the amplitude and velocity of vertical frame and wheel movement relative to each other.

Another object is to provide such a suspension in which lateral, vertical angular and a slight amount of longitudinal axle movements, with reference to the vehicle frame, are permitted and resiliently resisted, the lateral and angular resiliency being sufficient to absorb the lateral thrust of the axle, particularly resulting from one wheel moving up and down, thereby to provide increased safety, tire and gasoline mileage and stability, and the longitudinal resiliency being sufficient to eliminate detrimental vibrations due to rigidity of the axle lengthwise of the frame. The elimination of the axle rigidity vertically, longitudinally, and angularly with reference to the vehicle frame is requisite for maximum life of the frame, suspension, axle and tires as well as for maximum stability and safety and maximum economies in power and also preservation of the cargo.

Another important object is to provide such a suspension in which the resistance to such lateral or angular axle movement, with reference to the frame, is automatically controlled by an increasing resistance to motion in proportion to the amplitude and velocity of movement of the axle with reference to the frame.

Another object is, in single axle applications, the complete elimination of lubrication as well as the lubricant seals and the servicing incidental to parts requiring lubrication.

Another object is to provide such a suspension which will stand up without any servicing, repair or replacement, barring accident, for many years of service even under conditions of servere and constant use.

Another object is to provide such a suspension in which the frame is cradled and supported at well spaced points so as to reduce frame stresses.

Another object is to provide such a suspension which is very light in weight, particularly in unsprung weight, as compared with conventional suspensions.

Another object is to provide such a suspension in which very little shock absorber control is required.

Another object is to provide such a suspension consisting of compact units which can be arranged between each wheel and the frame without interference with vertical, lateral and vertical angular axle movement with respect to the frame.

Another object is to provide a suspension which provides a much wider base than that provided by conventional leaf springs. This objective is achieved by arranging the tandem rubber blocks, which form susbtantially the sole resilient resistance for the suspension, to project outwardly beyond and hence be intersected by the inner annular vertical facelines of the wheels and hence provide very wide spring centers for the vehicle.

Another object is to provide such a suspension which can be easily taken down and replaced.

Another most important object is to provide such a suspension which is low in cost, both as to initial cost and also upkeep, particularly as compared with conventional spring suspensions.

Another object is to provide such a suspension which renders radius rods or auxiliary devices for control of sidesway, such as torsion bar stabilizers, unnecessary, and at the same time adequately resists all brake and drive torque reactions.

Another object is to provide such a suspension in which periodic vibration of the suspension is dampened out and in which wheel tramp is avoided.

Another object is to provide a suspension which has a long and variable spring resistance range in both vertical, lateral and angular axle movements.

Another object is to provide such a suspension employing rubber blocks or bodies in rectilinear shear and in which the bond stress of the rubber is kept within safe working limits.

Other objects and advantages of the invention will appear from the following description and drawings in which:

Fig. 1 is a fragmentary top plan view of the rear end of a vehicle frame supported on a rear drive axle and drive wheels by a spring suspension embodying my invention.

Fig. 2 is an enlarged fragmentary side elevational view thereof, parts being shown in section.

Fig. 3 is an enlarged fragmentary top plan view similar to Fig. 1 and showing the parts in greater detail.

Fig. 4 is a vertical section taken on line 4—4, Fig. 2.

Fig. 5 is a fragmentary vertical section taken on line 5—5, Fig. 3.

Fig. 6 is a fragmentary vertical section taken on line 6—6, Fig. 5.

Fig. 7 is a fragmentary vertical section taken on line 7—7, Fig. 2.

Fig. 8 is a fragmentary view similar to Fig. 2 but diagrammatic in form and showing the position of the parts when the suspension is free or unsprung.

Fig. 9 is a similar view showing the position of the parts with the truck empty or unloaded and static.

Fig. 10 shows the position of the parts with the truck having a maximum static load.

Fig. 11 shows the position of the parts with the truck under maximum shock load and with the parts bottomed.

Fig. 12 is a view similar to Fig. 2 of a modified form of the invention.

Fig. 12a is a fragmentary enlarged sectional view of the stop means similar to Fig. 5.

Fig. 13 is a fragmentary top plan view of the modified form of the invention shown in Fig. 12.

Fig. 14 is a fragmentary vertical section taken on line 14—14, Fig. 12.

Fig. 15 is a view similar to Figs. 2 and 12 and showing a further modified form of the invention.

Fig. 16 is a fragmentary top plan view of the form of the invention shown in Fig. 15.

Fig. 17 is a fragmentary vertical section taken on line 17—17, Fig. 15.

In the various forms of the invention shown the main frame 15 of the vehicle can be of any suitable construction and is shown as comprising a pair of longitudinal side frame bars in the form of inwardly facing channels 16, which are shown as straight and parallel and as connected by cross bars 18. The entire vehicle chassis, together with its spring suspension, is constructed substantially symmetrically about a vertical longitudinal medial plane and hence it is deemed sufficient to confine the following detailed description to the one (left) side of the vehicle, it being understood that this description and the same reference numerals apply to the opposite (right) side of the vehicle.

The present invention is directed to the suspension at the rear end of the vehicle and which is supported on a rear or drive axle housing 20 in turn supported by rubber tired rear driving wheels 21 at its opposite ends, the wheels being fast to the usual pair of rear drive axles 22 connected by the usual differential contained in a differential housing 23 forming part of the drive axle housing. The term "wheels" as used herein includes the rubber tires thereof.

In the form of the invention shown in Figs. 1–11, on each end of the drive axle housing 20, externally of the corresponding side frame bar 16, is mounted an axle bracket 24 which can be secured in any suitable manner and which includes a rectangular horizontally disposed top plate 25 which is elongated lengthwise of the direction of movement of the vehicle or parallel with the adjacent side frame bar 16.

This top plate 25 of the axle bracket 24 supports a pair of coaxial rubber bushed bearings 26 the horizontal axis of which extends longitudinally of the vehicle frame 15. While these bearings 26 can be of any suitable construction, each preferably comprises a lower half bearing 28 and an upper half bearing 29. Each lower half bearing 28 comprises a semicylindrical channel 30 supported at its opposite longitudinal edges on vertical rectangular plates 31 welded thereto and at their lower edges to the top plate 25 of the axle bracket and preferably reinforced by internal cross plates 32, the upper edges of which are rounded to fit the semicylindrical channel 30. The upper half bearing 29 comprises an inverted U-shaped plate 33, the side legs of which straddle and fit against the side plates 31 of the lower half bearing and the lower ends of these side legs being bent outwardly to provide attaching flanges 34. Each of these attaching flanges 34 can be secured to the top plate 25 of the axle bracket by a plurality of bolts 35 and the upper rounding portion 36 of the plate 33 holds a cylindrical rubber bushing 37 firmly in contact with the semicylindrical channel 30 of the lower half bearing 28 and with a rod or tube 38 which is journalled in the rubber bushings 37 of the two bearings 26. Longitudinal displacement of this tube 38 is preferably prevented by a pair of flanges or rings 39 fixed to the tube on opposite sides of each bearing.

The tube 38 is part of a truss or rigid horizontal beam member 40 and for this purpose each end of this tube projects between and is welded, as indicated at 41, to the parallel flanges 42 of a pair of angle irons 43. The other flanges 44 of these angle irons project outwardly relative to each other and are in coplanar relation at a slight angle to the vertical such that the pairs of angle irons at opposite ends of the tube 38 converge upwardly.

A diagonal T-iron 45 has its lower end interposed between the lower ends of each pair of angle irons 43 and is welded thereto as indicated at 46. Each of these T-irons 45 extends diagonally upward to the tube 38 close to the adjacent bearing 26 and is welded thereto as indicated at 48.

The lower end of each of the diagonal T-irons 45 is continued in the form of a downwardly projecting tongue 49 which is interposed between the lower extremities of the corresponding pair of angle irons 43 and is apertured to receive a screw 50. These screws screw into the opposite ends of a lower tube 51 of the truss, the removability of this lower truss rod permitting the ready removal of the truss from the axle.

A vertically elongated rectangular metal plate 52 is secured to the external faces of the flanges 44 of each pair of angle irons 43 by bolts 53, these plates 52 thereby converging upwardly with reference to each other. To the face of each of these rectangular plates 52 opposite from the corresponding pair of angle bars 43 is vulcanized a pair of rubber bodies 54. The opposite faces of each pair of these rubber bodies are vulcanized to a vertically elongated intermediate rectangular metal plate 55 and to the opposite face of this intermediate plate 55 is vulcanized a single rubber body 56. The intermediate plate 55 is arranged parallel with the metal plate 52 and the cross sectional area of the single rubber body in a direction parallel with these plates is very substantially greater than the corresponding combined cross sectional area of the companion pair of rubber bodies 54, 54. The face of each single rubber body 56 opposite from the companion pair of rubber bodies 54 is vulcanized to a vertically elongated rectangular metal plate 58 which is disposed parallel with the plates 55 and 52 so that the two plates 58 at opposite ends of the truss converge upwardly relative to each other.

Each plate 58 is attached, as by bolts 59, to the flange 60 of a frame bracket 61, this flange projecting outwardly toward the plane of the corresponding wheel 21 from an attaching portion 62 which is shown as secured to the external face of the corresponding side frame bar 16 by bolts 63. The flange 60 is shown as reinforced by triangular webs 64 between it and the attaching portion 62 and the flanges 60 at opposite ends of the truss converge upwardly each parallel with the adjacent plates 58, 55 and 52.

Each pair of rubber bodies 54 provides the resilient resistance for light loads and impacts and to prevent overstressing of these pairs of rubber bodies 54, a pair of stops is provided between each pair of plates 52 and 55 to limit the relative upward movement of the plate 52. The stop 65 mounted on each of the plates 52 is of upwardly pointed V-shaped section in a direction parallel with the plate 52 to which it is attached by means of a downwardly projecting attaching flange 66, the stop being reinforced at the point of its V by a downwardly extending triangular reinforcing web 68. The stop 69 mounted on each of the plates 55 is of upwardly pointed V-shaped section in a direction parallel with the plate 55 to which it is attached by means of an upwardly projecting attaching flange 70, the stop being reinforced at the point of its V by an upwardly extending triangular reinforcing web 71. It will be seen that the stop 69 on the plate 55 provides a downwardly opening V-shaped pocket 72 which receives the V-shaped peak 73 of the stop 65 on the plate 52. This V-shaped form of these stops insures interaction of the stops even when they approach each other out of alinement. Such misalinement of these stops occurs as a consequence of the permitted laterally cushioned movement of the axle housing 20 with reference to the frame 15 and which is an important feature of the present invention.

Each pair of rubber bodies 56 comprises the main spring which provides resilient resistance to heavy loads and impacts and to prevent overstressing of these rubber bodies, a stop is provided between the plates 55 and the frame brackets 61 to limit the relative upward movement of the plate 55. Each of these stops is in the form of a horizontal flange 75 projecting over the corresponding rubber body 56 and plate 55 and reinforced by triangular webs 76. The upper edge of this plate meets this stop flange 75, the suspension bottoming when this occurs.

The lower end 78 of the intermediate plate 55 projects downwardly from the rubber bodies 54 and 56 and is bent so as to project downwardly away from the truss structure 40, these lower ends 78 on opposite sides of the truss thereby diverging downwardly relative to each other. The opposing faces of these extensions 78 of the intermediate plates 55 are engaged by the inclined portions 79 of wedge members 80. These wedge members 80 include downwardly extending attaching flanges 81 which are secured to the downwardly extending tongues 49 of the diagonal T-irons 45 by the screws 50 and the inclined portion 79 of each of these wedge members is preferably reinforced by vertical webs 82 between it and the attaching portion 81.

In the operation of the form of the invention shown in Figs. 1–11, the free spring condition of the suspension, that is, when there is no downward pressure upon the rubber bodies 54 and 56, is illustrated in Fig. 8.

When the load of the empty body is impressed upon the suspension, the weight of this empty body, through the frame brackets 61, impresses a downward force on each pair of main rubber bodies 56 so as to distort them to the condition shown in Fig. 9. This pressure is transmitted through the intermediate plate 55 to the pairs of rubber bodies 54 and since these rubber bodies 54 have a much smaller effective cross sectional area they are distorted to a much greater degree as illustrated in Fig. 9. The downward pressure is transmitted by these lighter pairs of rubber bodies 54 through their plates 52 to the vertical angle irons 43 secured to the ends of the upper and lower rods 38 and 51. Each of the upper rods 38 is supported through the bearings 26 on the axle bracket 24 and since these axle brackets are fast to the axle housing 20 this force is transmitted through this axle housing to the drive wheels 21.

When a full load is placed upon the body further downward pressure is impressed upon the rubber bodies 56 and 54 and these rubber bodies are brought to the position shown in Fig. 10. In this position of the parts the V-shaped male and female stops 65 and 69 are brought into engagement with each other and hence further vertical movement of the plates 52 and 55 is prevented. Since the lighter pairs of rubber bodies 54 are interposed between these plates it will be seen that these rubber bodies are under this condition stressed to their maximum extent and that further vertical and lateral stressing of these lighter rubber bodies 54 is prevented.

Since each pair of stops 65 and 69 is located intermediate a corresponding pair of the lighter rubber bodies 54, when these stops engage they create a leverage action which tends to move the lower end of the corresponding intermediate plate 55 away from the axle bracket 61. Accordingly with an increase of load upon the suspension, as would be created when passing irregularities in the road and fully loaded, the compression on the lower end of each main rubber body 56 would be relieved and excessive pressure would be impressed on the corresponding lower rubber body 54. To avoid this condition, when the truck is fully loaded, as illustrated in Fig. 10, the wedge portion 79 of the wedge member 80 contacts the downward wedge extension 78 of the intermediate plate 55 and hence forces the lower end of this plate toward the corresponding axle bracket 61 so as to compensate for the inequality in pressure on these rubber bodies caused by this lever action on the stops 65, 69.

Thereafter, when further upward force is impressed on this suspension as on encountering road irregularities when fully loaded the entire resilient resistance is provided by the large rubber bodies 56 and these rubber bodies are stressed upwardly until the intermediate plate 55 engages the stop flange 75, as shown in Fig. 11, at which time the suspension has bottomed and no further stressing of the rubber is possible.

It will be seen that each of the rubber bodies 54 and 56 at each end of the axle housing 20 is stressed upwardly in providing a resilient support for the corresponding frame corner, each of these rubber bodies having a rectilinear shear movement. It will further be seen that each pair of rubber bodies 54 is in series with the corresponding main rubber body 56 thereby to jointly provide the large amount of vertical axle movement necessary with highway vehicles to provide a vertical ride as soft as load heights will allow and at a low frequency.

Since each pair of rubber bodies 54 is of much smaller effective cross sectional area than the companion main rubber body 56, these pairs of rubber bodies flex under light load conditions and under light impacts to provide the desired ride when the truck is traveling empty or lightly loaded. The amplitude of axle movement permitted by these light rubber bodies 54 under light load conditions provides a low spring frequency, in the order of from 105 to 110 cycles per minute, at the rear end of conventional trucks when empty.

When the truck is loaded, however, these light rubber bodies 54 are prevented from being overstressed and are cut out of service by the engagement of the stops 65, 69 which positively limit the downward movement of the plate 55 relative to the plate 52 and hence the amount of force which can be impressed on these rubber bodies 54 and the degree of distortion and bond stress thereof.

Accordingly, when the truck is fully loaded, further downward impacts of the frame at each end of the axle housing 20 are yieldingly resisted by the main rubber bodies 56 and under such conditions these rubber bodies provide a low ride frequency, in the order of 100 cycles per minute, for the loaded truck. The maximum force which can be imposed on these main rubber bodies 56 is also limited by the stops 75 engaging the upper ends of the intermediate plates 55 and which causes the spring suspension to bottom without overstressing the rubber bodies or their bonds.

The leverage action created by engagement of the stops 65, 69 is also compensated by the wedge faces 78 and 79. Thus after engagement of these stops 65, 69, further downward pressure of each stop 69 on the stop 65 tends to rotate the lower end of the corresponding intermediate plate 55 towards the truss 40. Such movement of the lower ends of these intermediate plates 55 is prevented by the wedge members 78, 79 which engage each other simultaneously with the stops 65, 69.

A feature of the invention is that the rubber blocks 54, 56 permit laterally cushioned movement of the axle housing 20 relative to the frame 15. Since the rubber bodies 54 and 56 are shear springs and since they are arranged with their shear plane parallel with the axis of the rear axle, it will be seen that movement of the axle in the direction of its axis, or laterally of the frame is permitted and resiliently resisted by the rubber bodies. In this action the axle 20 and truss 40 move laterally of the frame 15 relative to the frame brackets 61, the rubber bodies 54 and 56 distorting horizontally to permit and yieldingly resist such movement. It will be noted that when the truck is lightly loaded most of the resilient resistance to such movement of the axle housing 20 relative to the frame 15 is provided by the lighter rubber bodies 54 so that under such circumstances a low laterally cushioned frequency is provided. At the same time proper engagement of the stops 65 and 69 is insured, even with such permitted lateral movement of the axle, When these stops 65 and 69 engage, as when the vehicle is loaded, all lateral cushioning of the movement of the axle housing 20 relative to the frame 15 is provided by the main rubber bodies 56 since the V-shaped form of the stops 65 and 69 prevent lateral distortion of the light rubber bodies 54. These main rubber bodies 56 provide the desired low laterally cushioned frequency for the loaded truck.

Angular movement of the axle housing 20, that is, when one wheel 21 rises relative to the opposite wheel, is also resiliently resisted by the rubber bodies 54 and 56. Thus the vertical component of such angular axle movement is resisted essentially by the light or small rubber bodies 54 under light load and impact conditions and by the heavy or large rubber bodies 56 under heavy load or impact conditions in the same manner as previously described for vertical axle movement. Similarly the horizontal component of such angular axle movement is resisted essentially by the light or small rubber bodies 54 under light load and impact conditions and by the heavy or large rubber bodies 56 under heavy load or impact conditions in the same manner as previously described for lateral axle movement relative to the frame. Full flexibility of the suspension under such angular axle movement is also permitted by the rubber bushings 37 of the bearings 26 and which permit a substantial degree of such angular axle movement without tipping the truss 40 laterally to a substantial extent and transmission of the forces to the springs 54 and 56. The function of these rubber bushings in accommodating angular movement of the axle housing 20 is an important feature of the invention.

The rubber bodies 54 and 56, as well as the rubber bushings 37, also permit a limited movement of the axle housing 20 longitudinally of the frame 15. While these are essentially shear springs acting at right angles to such axle movement, the desired axle movement lengthwise of the frame is very small, in the order of a small fraction of an inch. Such small resiliently permitted movement is essential, however, as against sledge hammer blows of the axle housing lengthwise of the frame and to provide some degree of flexibility in all directions.

Since the rubber blocks 54 are interposed between the upwardly converging plates 52 and 55 and since the rubber blocks 56 are interposed between the upwardly converging plates 55 and 58, it will be seen that upward movement of the axle brackets 61 effects a wedging action on these rubber blocks or bodies. This wedging action increases as the load increases. This wedging action greatly increases the load capacity of the rubber bodies vulcanized to their rectangular metal plates and through which the rubber bodies are secured to the frame brackets and the axle brackets. This wedging action also eliminates the cost of an adjusting mechanism between the rubber bodies at the opposite ends of each truss 40. It also simplifies the mounting problems by the elimination of such adjustment. It also improves the resistance curves of the springs. The resistance is more nearly constant at the start of deflection and increases, through compression of the rubber bodies, as the deflection increases.

Lubrication requirements are entirely eliminated in the suspension, and the suspension is designed to stand up under conditions of severe and constant use, regardless of atmospheric, climatic, road or type of load conditions, at least five years without service. Salt, road dust and weather conditions will not substantially affect the action of the suspension. Oil will slightly affect the rubber springs 54, 56 and rubber bushings 37, if made of natural rubber, but only the extreme outer portions thereof and will not go deep enough to cause any substantial damage within a five year period.

The spring suspension is also very light in weight as compared with conventional spring suspensions, particularly in unsprung weight. With the present trend toward legal load limits, any weight saving in the vehicle is valuable. However, unsprung weight is almost doubly important. It costs power and loss of load capacity to carry unnecessary weight and it costs at least double in power to carry unnecessary unsprung weight.

By making the truss 40 as long as shown, that is, greater than the diameter of the tire and wheel 21, all brake and drive torque reactions are absorbed by the suspension without the use of radius rods or other auxiliary devices. This is an important feature in the elimination of cost, weight and the necessity for servicing. Furthermore with the rigid horizontal beam member or truss 40 of such length, the rubber blocks 54, 56 at the opposite ends of each rigid horizontal beam member can project, as shown, beyond the wheel between them, that is, these rubber blocks project outwardly from the frame 15 to a position to be intersected by the plane of the inner annular faceline of the companion wheel, this faceline being that of the inner tire which is a part of the wheel. In other words, as the axle moves laterally of the frame or lengthwise of its axis, the plane of the inner faceline of the rubber tired wheel moving toward the frame can intersect the rubber blocks. In the arrangement shown these planes normally intersect these rubber blocks as shown in Fig. 1, but with extreme lateral movement of the axle, the outwardly moving wheel can move from between these blocks. Without such long length rigid horizontal beam member or truss 40 and the correspondingly large space between the rubber blocks at the ends of the beam and which large space locates these blocks beyond the periphery of the intermediate wheel, the rubber blocks could not, of course, be made of the horizontal size shown without interfering with the lateral movement of the axle, because they would strike the wheel.

The essential distinction between the form of the invention shown in Figs. 12–14 is that the truss structure is mounted entirely above the axle instead of being mounted so as to encompass the axle as with the form of the invention shown in Figs. 1–11.

As with the form of the invention shown in Figs. 1–11 the axle housing 20 as shown in Figs. 12–14 is provided at each end with an axle bracket 24 on which a pair of rubber bushed bearings 26 are mounted, these parts being of the same construction as in the preferred embodiment of the invention and hence the description not being repeated.

In these rubber bushed bearings 26 is journalled the lower rod 85 of a truss indicated generally at 86, the upper rod of this truss being indicated at 88. Each pair of truss rods 85, 88 is connected at opposite ends by a pair of longitudinal plates 89 which form webs extending longitudinally of these rods and have their upper and lower edges welded, respectively, to the lower and upper portions of the rods 88 and 85, respectively. The space 90 left in the center of the truss for accommodation of the rubber bushed bearings 26 is preferably reinforced by a pair of transverse plates 91 which are arranged intermediate the bearings 29 and have their upper and lower ends curved to fit the rods 88, 85 and are welded thereto.

Each end of each of the rods 85, 88 is butt welded to a transverse end plate 92, and each of these end plates is reinforced at its upper end by a triangular web 93 and at its lower end by a web 94, the lower end 95 of which projects outwardly beyond the end plate 92 so as to provide reinforcement for a lateral extension 96 of each end plate 92, this lateral extension 96 terminating in a wedge portion 98. The effective or outer surfaces of the wedge portions 98 of each spring unit for the end of the axle housing 20 converge upwardly, the purpose of these wedge portions being the same as the wedge portions 79 in the form of the invention shown in Figs. 1–11.

To the face of each end plate 92 opposite that secured to the truss rods 85, 88 is secured, as by bolts 99, a rectangular metal palte 100. To the face of each of these rectangular plates 100 opposite from that engaged by the end plate 92 is vulcanized a pair of rubber bodies 101, these being disposed in vertically spaced relation with a space 102 therebetween. To the opposite faces of this pair of rubber bodies 101 is vulcanized an intermediate metal plate 103 and to the opposite face of this intermediate metal plate 103 is vulcanized a large rubber body 104. The effective cross sectional area of this large rubber body 104 is very substantially greater than the combined ecective area of the corresponding pair of rubber bodies 101, the former acting as the main spring to resiliently absorb heavy impacts under load conditions and the latter being effective with an empty body or light loads to cushion lighter impacts. The opposite face of each of these rubber bodies 104 is vulcanized to a rectangular metal plate 105 which is secured, as by bolts 106, to the flange 108 of a frame bracket 109. These flanges 108 extend outwardly from attaching portions 110 of the brackets 109, each of these attaching portions being secured to the outer face of the corresponding side frame bar 16 by bolts 111. Also horizontal triangular reinforcing webs 112 are preferably provided between the attaching portion 110 of each frame bracket to reinforce the flange 108 thereof.

An important feature of the invention resides in the fact that at each end of the truss 86 the plates 92, 100, 103, 105 and the frame bracket flange 108 are arranged generally parallel with each other but converge upwardly and inwardly with reference to the corresponding plates 92, 100, 103, 105 and frame bracket flange 108 at the opposite end of the truss 86. By this converging disposition of these plates and flanges, a wedging force is impressed upon the rubber bodies 101 and 104 as downward movement of the frame 15 takes place in the same manner as with the rubber bodies 54 and 56 in the form of the invention shown in Figs. 1–11.

As with the form of the invention in Figs. 1–11, a pair of stops is provided between each pair of plates 100 and 103 to limit the relative upward movement of the plate 100. The stop 113 mounted on each of the plates 100 is of upwardly pointed V-shaped section in a direction parallel with its plate 100 and to which it is attached by means of a downwardly projecting attaching flange 114, the stop being reinforced at the point of its V by a downwardly extending triangular reinforcing web 115. The stop 116 mounted on each of the plates 103 is of upwardly pointed V-shaped section in a direction parallel with its plate 103 and to which it is attached by means of an upwardly projecting attaching flange 118, this stop being reinforced at the point of its V by an upwardly extending triangular reinforcing web 119.

It will be seen that the stop 116 on the plate 103 provides a downwardly opening V-shaped pocket 120 which receives the V-shaped peak 121 of the stop 113 on the plate 100. The V-shaped form of these stops insures interaction of the stops even when they approach each other out of alinement. Such misalinements of the stops occurs as a consequence of the permitted laterally cushioned movement of the axle housing 20 with reference to the frame 15 and which is an important feature of the invention.

As with the form of the invention shown in Figs. 1–11, the lower end 125 of the intermediate plate 103 projects downwardly from the rubber bodies 101 and 104 and is bent so as to project downwardly away from the truss structure 86 and parallel with the wedge portion 98 of the end plate 92. The opposing faces of these portions 125 and 98 of the intermediate plate 102 and end plate 92, respectively, are arranged to engage each other substantially simultaneously with the engagement of the stops 113 and 116 in the same manner as with the corresponding parts of the form of the invention shown in Figs. 1–11.

It will be seen that the operation of the form of the invention shown in Figs. 12–14 is essentially the same as that of the form of the invention shown in Figs. 1–11, and hence a detailed description of this operation is not repeated.

In the form of the invention shown in Figs. 15–17 the axle bracket 130 mounted on each end of the drive axle housing 20 is of somewhat different form from the axle brackets previously described. The axle bracket, indicated generally at 130, is shown as comprising a group of plates 131 arranged in face-to-face relation and projecting upwardly and disposed at right angles to the axle housing 20. The outermost, 132, of these plates is arranged on top of the axle housing 20 and is reinforced by a pair of triangular webs 133 welded to it and to the axle housing 20. The other two plates 134 and 135 of this group are recessed, as indicated at 136 and 138, to fit around the axle housing and are of less height than the plate 132 to provide a step 137 in rear of the front plate 132.

This step supports a pair of rubber bushed bearings 139 and for this purpose each of these rubber bushed bearings comprises a pair of counterpart half bearing sections 140 and 141 jointly providing a cylindrical bore receiving a rubber bushing 142 in which the lower rod 143 of a truss 144 is arranged. Each pair of half bearing parts 140, 141 is provided with depending flanges 145, 146 which jointly rest upon the step 136 and are secured to the front plate 132 by bolts 148 or in any other suitable manner. Each of these counterpart half bearing sections 141 and 142 is also provided with an upstanding flange 148 and 149, respectively, these flanges being secured together by bolts 150.

The truss is completed by an upper rod 152, these rods being joined together by vertical longitudinal plate 153 and which is welded along its upper and lower edges to the bottom and top, respectively, of the rods 152, 143. The plate 153 is spaced to provide an opening 155 for the rubber bushed bearings 139. In order to provide support between these rods in the center of the opening 155 vertical transverse plates 156 are provided, each of these plates being rounded at its top and bottom to fit around the rods 152, 143 and being welded thereto intermediate the rubber bushed bearings 139. The rubber bushings 142 of each of these bearings 139 are axially confined by metal rings 158 welded to the tube or rod 143.

At one end of the truss, this being the right hand end as viewed in Fig. 16, the tubes 143 and 152 of the truss 144 are butt welded to a vertical end plate 160 and each of these end plates is reinforced at its upper end by a triangular web 161 and at its lower end by a web 162, the lower end 163 of which projects outwardly beyond the end plate 160 so as to provide reinforcement for a lateral extension 164 of the end plate 160, this lateral extension 164 terminating in a wedge portion 165. The wedge portion 165 inclines upwardly and toward the truss 144.

To the face of the end plate 160 opposite that secured to the truss rods 143, 152 is secured, as by bolts 166, a rectangular metal plate 168. To the face of this plate 168 opposite from that engaged by the end plate 160 is vulcanized a pair of rubber bodies 169, these being disposed in vertically spaced relation with a space 170 therebetween. To the opposite faces of this pair of rubber bodies 169 is vulcanized an intermediate plate 171 and to the opposite face of this intermediate plate 171 is vulcanized a large rubber body 172. The effective cross sectional area of this large rubber body 172 is very substantially greater than the combined effective area of the corresponding pair of rubber bodies 169, the former acting as a main spring to resiliently absorb heavy impacts under load conditions and the latter being effective with an empty body or light loads to cushion lighter impacts. The opposite face of the large rubber body 172 is vulcanized to a rectangular metal plate 173 which is secured, as by bolts 174, to the flange 175 of a frame bracket 176. The flange 175 extends outwardly from an attaching portion 178, this attaching portion being secured to the outer face of the corresponding side frame bar by bolts 179. Also horizontal triangular reinforcing webs 180 are preferably provided between the attaching portion 178 and flange 175 of the bracket 176.

As with the forms of the invention previously described, an upwardly pointed V-shaped male stop 182 on the plate 168 fits into and engages the downwardly opening V-shaped pocket of a female stop 183 on the plate 171, these stops being arranged in the space 170 between the rubber bodies 169. These stops serve to limit the downward movement of the plate 171 relative to the plate 168 and thereby limit the force capable of being applied by the body to the lighter rubber springs 169. Since these stops are identical with the corresponding V-shaped stops of the forms of the invention previously described, the description is not repeated. Also to compensate for the leverage action of these stops 182 and 183 in forcing the lower end of the intermediate plate 171 toward the truss 144, as with the forms of the invention previously described, the lower end 184 of this intermediate plate 171 is extended and arranged at an angle to have wedging engagement with the wedge portion 165 of the end plate 160 when the stops 182 and 183 interengage. Also as with the other forms of the invention, the upper end of the flange 175 of the frame bracket 176 is flanged over the intermediate plate 171, as indicated at 185, to form a stop in limiting the upward movement of this plate and thereby prevent excessive strain on the large rubber body 172.

At the other, or right hand end of the truss, as viewed in Fig. 16, the tubes 143 and 152 of the truss are internally threaded to receive the thread ends of a pair of screws 192, each of these screws being provided with a neck 193 which is square or out-of-round in cross section and a cylindrical end head 194. Each of these cylindrical end heads 194 fits into a cylindrical socket 195 welded to a vertical end plate 168 identical with the vertical end plate 168 at the other end of the truss. The cylindrical end head 194 of each screw 192 is held against rotation by a removable pin 196 and the two sockets 195 are shown as reinforced by a vertical web 198. In other respects the rubber spring assembly at the left hand end of the suspension is the same as the right hand end, the same reference numerals being employed and the description not being repeated.

The essential difference between the form of the invention shown in Figs. 15–17 and those previously described is that in the forms of the invention shown in Figs. 1–14 the plates vulcanized to the rubber blocks are set at an angle so as to have a wedging action on the rubber blocks as greater loads or impacts are transmitted through the suspension. In contrast, in the form of the invention shown in Figs. 15–17, these plates for the rubber blocks, at both ends of the truss, are parallel. In consequence an adjustment for the degree of compression of the rubber blocks must be provided, this being supplied by the screws 192 which, when extended, exert a greater degree of pressure on the rubber blocks 169 and 172. Since in other respects the action of the suspension shown in Figs. 15–17 is similar to the action of the forms of the invention shown in Figs. 1–14, this description is not repeated.

By "rubber" as used in the accompanying claims is meant natural rubber, synthetic rubber, or combinations of natural and synthetic rubber.

I claim:

1. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, and a rigid horizontal beam member fast to said axle adjacent said frame brackets and comprising an upper generally horizontal bar extending lengthwise of said frame, a lower bar generally parallel with said upper bar, reinforcing means connecting said bars, and a generally vertical plate connecting the ends of said bars at each end of said rigid horizontal beam member and each secured to the corresponding rubber block whereby said rubber blocks resiliently support said frame on said rigid horizontal beam member and axle.

2. A vehicle spring suspension adapted to be interposed between the frame of a highway vehicle and an axle having a wheel journalled thereon, comprising a frame bracket fixed to said frame in advance of said wheel and having a generally vertical face opposing said axle, a second frame bracket fixed to said frame in rear of said wheel and having a generally vertical face opposing said axle, the spacing of said frame brackets being greater than the diameter of said wheel, a rubber block secured to each of said vertical faces in position to permit vertical flexure of said rubber blocks, and a rigid horizontal beam member fast to said axle intermediate said rubber blocks and comprising an upper generally horizontal bar extending lengthwise of said frame, a lower bar generally parallel with said upper bar, a reinforcement connecting said bars, and a generally vertical plate connecting the ends of said bars at each end of said rigid horizontal beam member and each having a generally vertical face extending transversely of said frame and secured to that face of the corresponding rubber block opposing the other rubber block whereby said rubber blocks resiliently support said frame on said rigid horizontal beam member and axle.

3. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, an axle structure extending lengthwise of said frame, means securing each fore-and-aft end of said axle structure to the corresponding rubber block and means securing said axle structure to said axle, comprising an axle bracket on said axle, and a bearing fast to said axle bracket with its axis extending lengthwise of said frame and having a rubber bushing in which said axle structure is journalled.

4. A vehicle spring suspension adapted to be interposed between the frame of a highway vehicle and an axle having a wheel jorunalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, an axle structure extending lengthwise of said frame, means securing each fore-and-aft end of said axle structure to the corresponding rubber block and means securing said axle structure to said axle, comprising an axle bracket on said axle, and a pair of coaxial bearings fast to said axle bracket on a generally horizontal axis extending lengthwise of said frame and having a rubber bushing in which said axle structure is journalled.

5. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, and a rigid horizontal beam member fast to said axle adjacent said frame brackets and comprising an upper generally horizontal bar extending lengthwise of said frame and arranged above said axle, a lower bar generally parallel with said upper bar and arranged below said axle, a reinforcement connecting said bars, and a generally vertical plate connecting the ends of said bars at each end of said rigid horizontal beam member and each secured to the corresponding rubber block whereby said rubber blocks resiliently support said frame on said rigid horizontal beam member and axle.

6. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and arranged below said axle, a reinforcement connecting said bars, and a generally vertical plate connecting the ends of said bars at each end of said rigid horizontal beam member and each secured to the corresponding rubber block, and means securing said upper bar to said axle.

7. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and arranged below said axle, a reinforcement connecting said bars, and a generally vertical plate connecting the ends of said bars at each end of said rigid horizontal beam member and each secured to the corresponding rubber block, and means securing said upper bar to said axle, comprising an axle bracket on said axle, and a bearing fast to said axle bracket and in which said upper bar is journalled.

8. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and arranged below said axle, a reinforcement connecting said bars, and a generally vertical plate connecting the ends of said bars at each end of said rigid horizontal beam member and each secured to the corresponding rubber block, and means securing said upper bar to said axle, comprising an axle bracket on said axle, and a bearing fast to said axle bracket and having a rubber bushing in which said upper bar is journalled.

9. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and arranged below said axle, a reinforcement connecting said bars, and a generally vertical plate connecting the ends of said bars at each end of said rigid horizontal beam member and each secured to the corresponding rubber block, and means securing said upper bar to said axle, comprising an axle bracket on said axle, and a pair of bearings fast to said axle bracket and arranged on opposite sides of said axle along a generally horizontal axis extending lengthwise of said frame and each having a rubber bushing in which said upper bar is journalled.

10. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and arranged below said axle, a reinforcement connecting said bars, a pair of generally vertical plates each fixed to the corresponding end of said upper bar, and means removably securing said lower bar to each of said plates, and means securing said upper bar to said axle.

11. A vehicle spring suspension adapted to be interposed btween the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, and a rigid horizontal beam member fast to said axle adjacent said frame brackets and comprising an upper generally horizontal bar extending lengthwise of said frame and arranged above said axle, a lower bar generally parallel with said upper bar and also arranged above said axle, a reinforcement connecting said bars, and a generally vertical plate connecting the ends of said bars at each end of said rigid horizontal beam member and each secured to the corresponding rubber block whereby said rubber blocks resiliently support said frame on said rigid horizontal beam member and axle.

12. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and also arranged above said axle, a reinforcement connecting said bars, and a generally vertical plate connecting the ends of said bars at each end of said rigid horizontal beam member and each secured to the corresponding rubber block, and means securing said lower bar to said axle.

13. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and also arranged above said axle, a reinforcement connecting said bars, and a generally vertical plate connecting the ends of said bars at each end of said rigid horizontal beam member and each secured to the corresponding rubber block, and means securing said lower bar to said axle, comprising an axle bracket on said axle and in which said lower bar is journalled.

14. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in positon to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and also arranged above said axle, a reinforcement connecting said bars, and a generally vertical plate connecting the ends of said bars at each end of said rigid horizontal beam member and each secured to the corresponding rubber block, and means securing said lower bar to said axle, comprising an axle bracket on said axle and having a rubber bushing in which said lower bar is journalled.

15. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, a rigid horizontal beam member adjacent said frame brackets and comprising an upper generally horizontal bar extending lengthwise of said frame and arranged above said axle, a lower bar generally parallel with said upper bar and also arranged above said axle, a reinforcement connecting said bars, and a generally vertical plate connecting the ends of said bars at each end of said rigid horizontal beam member and each secured to the corresponding rubber block, and means securing said lower bar to said axle, comprising an axle bracket on said axle, and a pair of bearings fast to said axle bracket and arranged on opposite sides of said axle along a generally horizontal axis extending lengthwise of said frame and each having a rubber bushing in which said lower bar is journalled.

16. A vehicle spring suspension adapted to be interposed between the frame of a highway vehicle and an axle having a wheel journalled thereon, comprising a frame bracket fixed to said frame in advance of said wheel and having a generally vertical face opposing said axle, a second frame bracket fixed to said frame in rear of said wheel and having a generally vertical face opposing said axle, the spacing of said frame brackets being greater than the diameter of said wheel, a rubber block secured to each of said vertical faces in position to permit vertical flexure of said rubber blocks, a pair of plates secured to the opposing faces of said rubber blocks, an axle structure fast to said axle and extending lengthwise of said frame between said rubber blocks, means connecting one of said plates to the corresponding end of said axle structure, a pair of vertically spaced screws threadedly secured to the opposite end of said axle structure to be extensible therefrom lengthwise of said frame, and means connecting the other of said plates to said screws.

17. A vehicle spring suspension adapted to be interposed between the frame of a highway vehicle and an axle having a wheel journalled thereon, comprising a frame bracket fixed to said frame in advance of said wheel and having an upwardly and rearwardly inclined face opposing said axle, a second frame bracket fixed to said frame in rear of said wheel and having and upwardly and forwardly inclined face opposing said axle, the spacing of said frame brackets being greater than the diameter of said wheel, a rubber block secured to each of said faces in position to permit vertical flexure of said rubber blocks, an axle structure fast to said axle and extending lengthwise of said frame between said rubber blocks and including fore-and-aft transverse end plates each generally parallel with and opposing the said face of the corresponding bracket and said plates being secured to the opposing faces of said rubber blocks.

18. A vehicle spring suspension adapted to be interposed between the frame of a highway vehicle and an axle having a wheel journalled thereon, comprising a frame bracket fixed to said frame in advance of said wheel, a second frame bracket fixed to said frame in rear of said wheel, the spacing of said frame brackets being greater than the diameter of said wheel, a rubber block secured to each of said frame brackets in position to permit vertical flexure of said rubber blocks, an axle structure fast to said axle and extending lengthwise of said frame adjacent said frame brackets, means securing each end of said axle structure to the corresponding rubber block whereby said rubber blocks resiliently support said frame on said axle structure and axle and stops interposed between each end of said axle structure and the corresponding frame bracket and limiting the upward flexure of said rubber blocks.

19. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, and a rubber block fast to the opposite faces of each of said plates and also fast to the corresponding faces of the corresponding frame bracket and axle bracket structure, respectively.

20. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, and a rubber block fast to the opposite faces of each of said plates and also fast to the corresponding faces of the corresponding frame bracket and axle bracket structure, respectively, the spacing of said plates and the rubber blocks secured thereto being at least equal to the diameter of said wheel.

21. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, a rubber block fast to the opposite faces of each of said plates and also fast to the corresponding faces of the corresponding frame bracket and axle bracket structure, respectively, and a stop interposed between each of said plates and the corresponding frame bracket and limiting the upward movement of each plate relative to the corresponding frame bracket.

22. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, a rubber block fast to the opposite faces of each of said plates and also fast to the corresponding faces of the corresponding frame bracket and axle bracket structure, respectively, and a stop interposed between each of said plates and said axle bracket structure and limiting the upward movement of said axle bracket structure relative to said plates.

23. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, a rubber block fast to the opposite faces of each of said plates and also fast to the corresponding faces of the corresponding frame bracket and axle bracket structure, respectively, a stop interposed between each of said plates and the corresponding frame bracket and limiting the upward movement of each plate relative to the corresponding frame bracket, and a stop interposed between each of said plates and said axle bracket structure and limiting the upward movement of said axle bracket structure relative to said plates.

24. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, a rubber block fast to the opposite faces of each of said plates and also fast to the corresponding faces of the corresponding frame bracket and axle bracket structure, respectively, a stop interposed between a central part of each of said plates and said axle bracket structure and limiting the upward movement of said axle bracket structure relative to said plates, a wedge member on the lower end of each of said plates, and a pair of wedge members on said axle bracket structure and each cooperating with a corresponding wedge member of said plates to wedge the lower ends of said plates toward said frame brackets on upward movement of said axle bracket structure relative to said frame.

25. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, a rubber block fast to the opposite faces of each of said plates and also fast to the corresponding faces of the corresponding frame bracket and axle bracket structure, respectively, a stop interposed between the upper end of each of said plates and the corresponding frame bracket and limiting the upward movement of each plate relative to the corresponding frame bracket, a stop interposed between a central part of each of said plates and said axle bracket structure and limiting the upward movement of said axle bracket structure relative to said plates, a wedge member on the lower end of each of said plates, and a pair of wedge members on said axle bracket structure and each cooperating with a corresponding wedge member of said plates to wedge the lower ends of said plates toward said frame brackets on upward movement of said axle bracket structure relative to said frame.

26. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, and a rubber block fast to the opposite faces of each of said plates and also fast to the corresponding faces of the corresponding frame bracket and axle bracket structure, respectively, one rubber block of the pair fast to each of said plates being lighter than the other so as to provide different degrees of resilient resistance to upward movement of said axle.

27. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, a rubber block fast to the opposite faces of each of said plates and also fast to the corresponding faces of the corresponding frame bracket and axle bracket structure, respectively, a stop interposed between each of said plates and the corresponding frame bracket and limiting the upward movement of each plate relative to the corresponding frame bracket, and a stop interposed between each of said plates and said axle bracket structure and limiting the upward movement of said axle bracket structure relative to said plates, one rubber block of the pair fast to each of said plates being lighter than the other so as to provide different degrees of resilient resistance to upward movement of said axle.

28. A vehicle spring suspension adapted to be interposed between the frame of a highway vehicle and an axle having a wheel journalled thereon, comprising a pair of frame brackets secured to said vehicle frame at one side thereof and each having a generally vertical face arranged generally parallel with said axle, an axle bracket structure fast to said axle and having faces generally parallel with and in opposing relation to the said generally vertical faces of said frame brackets, a plate interposed between each pair of said opposing faces of said frame brackets and axle bracket structure and arranged generally parallel therewith, and a rubber block fast to the opposite faces of each of said plates and also fast to the corresponding faces of the corresponding frame bracket and axle bracket structure, respectively, said faces of said frame brackets converging upwardly relative to each other and the opposing faces of said axle bracket structure also converging upwardly relative to each other.

29. A vehicle spring suspension adapted to be interposed between the frame of a highway vehicle and a single axle having a wheel journalled thereon, comprising an axle bracket secured to said axle adjacent said wheel, a pair of frame brackets severally secured to said frame adjacent said wheel in rear and in advance of said axle, each of said frame brackets having a generally flat vertically extending face extending in a direction lengthwise of said axle, a rigid horizontal beam member secured to said axle bracket and extending lengthwise of said frame adjacent said frame brackets, members severally secured at the opposite fore-and-aft ends of said rigid horizontal beam member and each having a generally flat vertically extending face extending in a direction lengthwise of said axle and arranged in opposing relation to the corresponding face of said frame brackets, a pair of rubber bodies arranged between each of said frame brackets and the corresponding member secured to said rigid horizontal beam member, the rubber bodies of each pair each having opposite substantially flat and parallel faces, one face of each body of each pair being secured to a corresponding one of said generally flat vertically extending faces, a generally vertical and flat plate interposed between and secured to the other flat faces of each pair of rubber bodies, whereby said plate moves vertically and also horizontally in a direction lengthwise of said axle, and a stop on said frame and arranged to limit upward movement of each of said horizontally movable flat plates, whereby following a predetermined upward flexure of each pair of said rubber bodies further movement of one rubber body of each pair is prevented, each said one rubber body of each pair being of smaller cross sectional area in a direction lengthwise of said axle than its companion rubber body.

30. A vehicle spring suspension adapted to be interposed between the frame of a highway vehicle and a single axle having a wheel journalled at one end of said axle exteriorly of said frame and said wheel having an inner annular faceline opposing said frame, comprising a frame bracket rigidly fixed to said frame in advance of said wheel and having a generally vertical face opposing said wheel, a second frame bracket rigidly fixed to said frame in rear of said wheel and having a generally vertical face opposing said wheel, the spacing of said frame brackets being greater than the diameter of said wheel and said brackets being in the plane of said inner annular faceline of said wheel, a rectilinear movement type shear rubber spring block secured to each of said vertical faces in position to permit horizontal flexure lengthwise of said axle as well as vertical flexure of said rubber blocks, a rigid, horizontal beam member which is substantially straight in a vertical plane lengthwise of said frame and which is fast to said axle and extends lengthwise of said frame beyond said wheel and substantially in vertical alinement with the centers of said rubber blocks, means securing the front and rear ends of said rigid beam member to the opposing faces of said rubber blocks whereby said rubber blocks form substantially the sole resilient support for said frame on said one end of said axle and also resiliently permits horizontal movement of the opposite end of said rigid beam member laterally of said frame, said rubber blocks also being in the vertical plane of the inner annular vertical faceline of said wheel.

References Cited in the file of this patent

UNITED STATES PATENTS

| | | |
|---|---|---|
| 1,588,245 | Lipcot | June 8, 1926 |
| 2,099,031 | Neal et al. | Nov. 16, 1937 |
| 2,138,449 | Hallquist | Nov. 29, 1938 |
| 2,166,822 | Parker | July 18, 1939 |
| 2,180,860 | Brown | Nov. 21, 1939 |
| 2,417,690 | Keller | Mar. 18, 1947 |
| 2,599,469 | Merry | June 3, 1952 |